US009762471B2

(12) United States Patent
Vicat-Blanc et al.

(10) Patent No.: US 9,762,471 B2
(45) Date of Patent: Sep. 12, 2017

(54) METHODS AND SYSTEMS FOR ESTIMATING AND ANALYZING FLOW ACTIVITY AND PATH PERFORMANCE DATA IN CLOUD OR DISTRIBUTED SYSTEMS

(71) Applicant: F5 Networks, Inc., Seattle, WA (US)

(72) Inventors: Pascale Vicat-Blanc, San Francisco, CA (US); Romaric Guillier, Lyons (FR); Sebastien Soudan, Lyons (FR)

(73) Assignee: F5 Networks, Inc., Seattle, WA (US)

( * ) Notice: Subject to any disclaimer, the term of this patent is extended or adjusted under 35 U.S.C. 154(b) by 429 days.

(21) Appl. No.: 14/027,142

(22) Filed: Sep. 13, 2013

(65) Prior Publication Data
US 2014/0215058 A1 Jul. 31, 2014

Related U.S. Application Data

(60) Provisional application No. 61/757,138, filed on Jan. 26, 2013.

(51) Int. Cl.
*H04L 12/26* (2006.01)

(52) U.S. Cl.
CPC ............ *H04L 43/14* (2013.01); *H04L 43/045* (2013.01); *H04L 43/026* (2013.01); *H04L 43/0852* (2013.01); *H04L 43/0888* (2013.01)

(58) Field of Classification Search
CPC ....... H04L 41/22; H04L 43/14; H04L 47/822; H04L 43/045
See application file for complete search history.

(56) References Cited

U.S. PATENT DOCUMENTS 8,095,929 B1 * 1/2012 Ji ......................... G06F 9/4856
709/223
8,145,760 B2 3/2012 Dinda et al.
(Continued)

FOREIGN PATENT DOCUMENTS

FR 2858900 A1 2/2005
FR 2913838 9/2008
(Continued)

OTHER PUBLICATIONS

"International Search Report and Written Opinion dated Mar. 25, 2011 issued to the priority International Application No. PCT/FR2011/050041", Mar. 25, 2011, 9 pgs.
"Int'l Application Serial No. PCT/US2014/011150, Search Report & Written Opinion mailed Mar. 31, 2014", 10 pgs.
"Int'l Application Serial No. PCT/US2014/012550, Search Report and Written Opinion mailed Apr. 29, 2014", 9 pgs.
Chen, B B et al., "Supporting Bulk Data Transfer of High-End Applications with Guaranteed Completion Time", Proceedings of the 2007 IEEE International Conference on Communications, Jun. 24-28, 2007, 575-580.
(Continued)

*Primary Examiner* — Larry Donaghue
(74) *Attorney, Agent, or Firm* — LeClairRyan, a Professional Corporation

(57) ABSTRACT

Virtual resources associated with an execution of a user's applications in a cloud or distributed resource configuration including virtual or physical machines, network services and storage are identified. A source and destination virtual machine, utilized by the user's applications, are determined, and at least one source or destination virtual machine belongs to the identified virtual resources. Measurement software for a virtual machine is downloaded. The measurement software acquires data for connections established in a transport layer for communicating between the source and destination virtual machine. Data acquired from the measurement software is received at a first time, and the data includes measurements of variables for the data communications via the connections. Based upon the measurements, metrics that characterize the data communications at a first time are generated. Measurements made at an additional number of times are also received. Based upon the measurements, metrics are generated as a function of time.

24 Claims, 8 Drawing Sheets

(56) References Cited

U.S. PATENT DOCUMENTS

| | | |
|---|---|---|
| 2005/0157644 A1 | 7/2005 | Johansson et al. |
| 2007/0220521 A1 | 9/2007 | Chevanne et al. |
| 2008/0052719 A1 | 2/2008 | Briscoe et al. |
| 2008/0192773 A1 | 8/2008 | Ou et al. |
| 2008/0285578 A1 | 11/2008 | DeLay et al. |
| 2009/0006069 A1 | 1/2009 | Alam et al. |
| 2010/0058366 A1 | 3/2010 | Swildens |
| 2012/0042061 A1 | 2/2012 | Ayala et al. |
| 2012/0054278 A1 | 3/2012 | Taleb et al. |
| 2012/0110650 A1 | 5/2012 | Van Biljon et al. |
| 2012/0209980 A1 | 8/2012 | Johnston-Watt et al. |
| 2012/0304175 A1 | 11/2012 | Damola |
| 2012/0317164 A1 | 12/2012 | Zhou |
| 2014/0201642 A1* | 7/2014 | Vicat-Blanc ............ H04L 41/22 715/736 |
| 2014/0215077 A1* | 7/2014 | Soudan .................. H04L 47/11 709/226 |

FOREIGN PATENT DOCUMENTS

| | | |
|---|---|---|
| WO | 03/084157 A1 | 10/2003 |
| WO | 2008093174 A1 | 8/2008 |
| WO | 2009007620 A2 | 1/2009 |

OTHER PUBLICATIONS

Reinhardt "Advanced Reservation of Network Resources for Multimedia Applications", ProceedingIWACA, Dec. 31, 1994, 1-11.

Soudan, et al., "Flowing Schedule and endpointe rate control in Gridnetworks", Future Generations Computer Systems, Elsevier Science Publishers. Amsterdam, NL, Sep. 1, 2009, 8 pgs.

\* cited by examiner

METHODS AND SYSTEMS FOR ESTIMATING AND ANALYZING FLOW ACTIVITY AND PATH PERFORMANCE DATA IN CLOUD OR DISTRIBUTED SYSTEMS

CROSS-REFERENCE TO RELATED APPLICATION

This application claims priority of U.S. Provisional Patent Application No. 61/757,138, entitled METHODS AND SYSTEMS FOR ESTIMATING AND ANALYZING FLOW ACTIVITY AND PATH PERFORMANCE DATA IN CLOUD NETWORKS, filed 26 Jan. 2013 by Pascale VICAT-BLANC, et al., which application is incorporated herein by reference in its entirety for all purposes.

TECHNICAL FIELD OF THE INVENTION

The invention relates to the area of measuring and modeling end-to-end network and traffic in the context of virtual or physical networks. More particularly, the invention relates to characterizing network performance and communication patterns between virtual or physical machines executing specific applications in a distributed or cloud environment.

BACKGROUND

In the cloud, applications are distributed and deployed over virtual resources that are dynamically provisioned and mapped to a pool of physical servers that are allowed to communicate in some manner through some type of physical network. From a customer perspective, the virtual resources are typically virtual machines that execute customer applications. The machines are "virtual" in the sense that 1) the underlying physical servers on which the virtual machines are operating can change over time (migration), 2) a variable number of virtual machines are running on the same physical server, sharing the underlying processor, memory, disk and network interface capabilities (sharing). Using the abstraction of a virtual machine, the changing nature of the physical servers is opaque to customer applications, yet, can cause the applications to experience variable and unpredictable performance.

The customer applications often include components that execute on different virtual machines that need to communicate with one another to complete a particular task. Thus, a virtual network is formed between the virtual machines where the performance of the virtual resources, including both the virtual network and the virtual machines, affects how quickly the particular task is completed within the customer application. The performance of the virtual resources is constantly changing and is difficult to characterize as the underlying physical resources are constantly changing. In addition, for a particular customer application, how the application interacts with the virtual resources affects the perceived performance of the virtual resources from the point of view of the application. This coupling between the application and the resources adds additional complexity to the performance characterization problem.

Every customer utilizing cloud resources wants to ensure that their applications are sufficiently optimized to meet the demands of their business at all times while not wasting resources. Currently, resource management tools are very limited or non-existent. In view of the above, new methods and apparatus for application specific cloud resource management are needed.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A system for allowing users and organizations to access on-demand, and in a personalized way, system and network performance and flow activity measures of an end-to-end network path is described. The system may combine four distinct techniques: 1) Operating system instrumentation (transport layer), 2) customizable sampling of some internal variables of the transport layer, 3) processing and extraction of the sample results to a specific data structure to make them accessible and 4) on-demand, visualization of the information outside the kernel. In particular embodiments, the samples aggregate and expose internal data of the control algorithms embedded in the TCP/UDP/IP stack. These techniques enable the application to automatically discover its bandwidth needs between point A and point B and infer the health and the behavior of the end-to-end A-B path. The health and behavior can be characterized according to one or more metrics. This information can be used to make accurate high level provisioning and deployment decisions accordingly.

In one embodiment, a method implemented in at least one electronic device including a processor and a memory is disclosed. Virtual resources that are associated with an execution of a user's applications in a cloud or distributed resource configuration including virtual or physical machines, network services and storage are identified. A source virtual machine and a destination virtual machine, utilized by the user's applications, are determined, and at least one of the source virtual machine or the destination virtual machine belongs to the identified virtual resources. Measurement software for execution on one of the source virtual machine or the destination virtual machine is downloaded. The measurement software is configured to acquire data associated with a plurality of connections established in a transport layer that enable data communications between the source virtual machine and the destination virtual machine. First data acquired from the measurement software is received at a first time, and the first data includes measurements of a plurality of variables associated with the data communications via the plurality connections. Based upon the measurements, one or more metrics that characterize the data communications at a first time are generated. Measurements made at an additional number of times after the first time are also received. Based upon the measurements, one or more metrics are generated as a function of time.

In a specific implementation, the plurality of variables is a plurality of TCP (Transport Control Protocol) variables, UDP (User Datagram Protocol) variables or combinations thereof. In a further aspect, the TCP variables are measured using the TCB (Transmission Control Block) in a TCP stack. In another aspect, the TCP or the UDP variables are measured for each of the plurality of connections. In another embodiment, the plurality of connections is a plurality of TCP or UDP connections. In one example, a first metric is associated with a latency metric. In another example, a second metric is associated with a throughput.

In a specific embodiment, IP addresses, ports, and UUIDs (universally unique identifiers) of the virtual resources are determined and associated with each of the plurality of connections. In another aspect, a first metric is generated based upon measurements associated with a subset of the plurality of connections. In another aspect, the one or more metrics are formatted for visual presentation on a display coupled to the electronic device. In another specific implementation, a topology map of the identified virtual resources in the cloud resource configuration is generated and output. In yet another embodiment, the source or the destination include multiple instantiations of one of the customer's application component. In another example, each virtual resource is a virtual machine, a virtual load balancer, a virtual router, a virtual switch, or a virtual link. In yet another implementation, the plurality of variables are sampled from TCP variables that are updated by a TCP stack when a packet is sent and an acknowledgement is received on one or more of the connections. In a further aspect, a frequency of sampling from TCP variables is set by a user or specific TCP variables from which to sample are selected by a user.

In an alternative embodiment, the invention pertains to an apparatus for cloud distributed computing resource management. The apparatus is formed from one or more electronic devices that are configured to perform one or more of the above described method operations. In another embodiment, the invention pertains to at least one computer readable storage medium having computer program instructions stored thereon that are arranged to perform one or more of the above described operations.

These and other aspects of the invention are described further below with reference to the figures.

DETAILED DESCRIPTION OF EXAMPLE EMBODIMENTS

Figure 1:
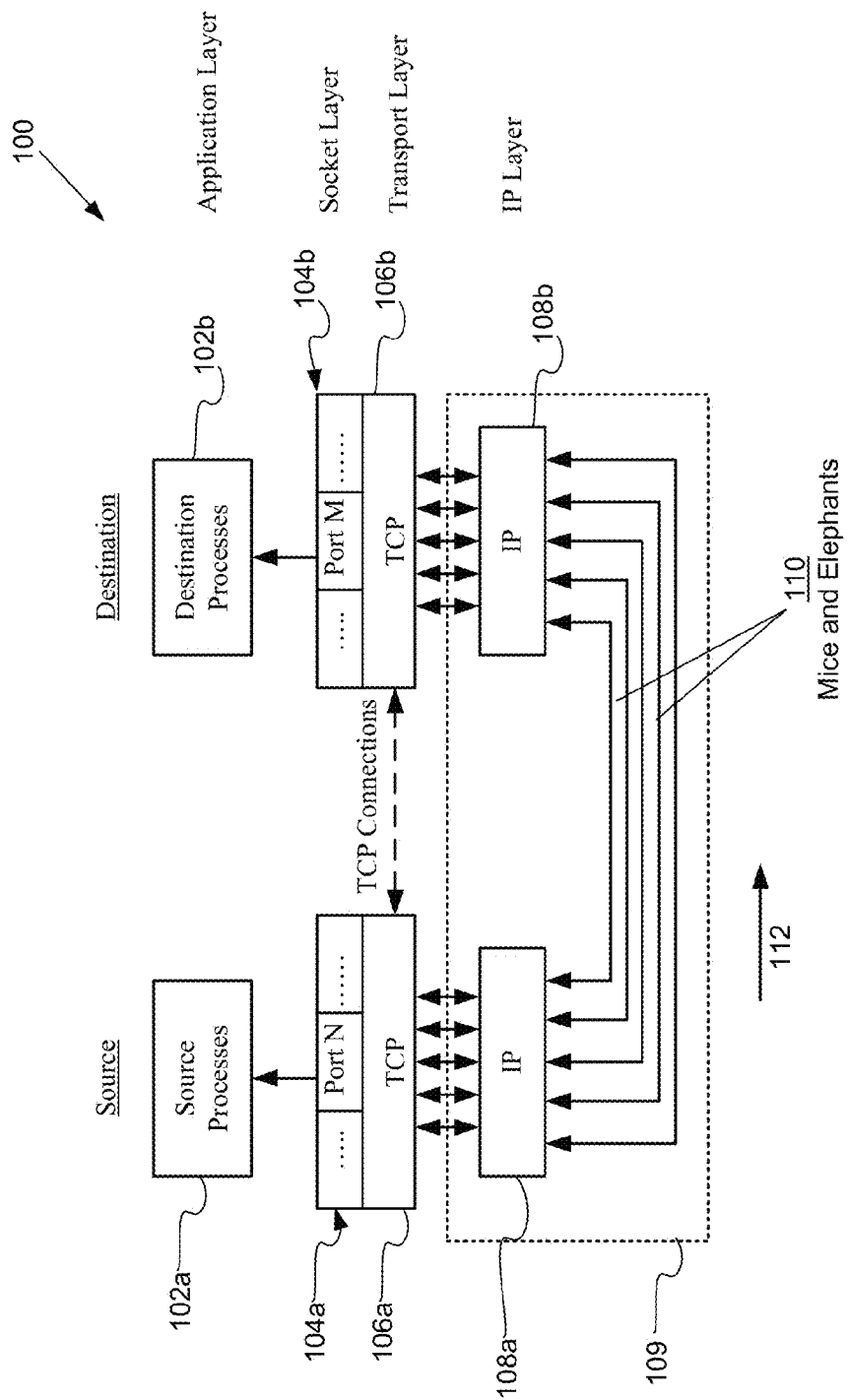
FIG. 1 shows a flow path abstraction, including a source and a destination, for one embodiment.

In the following description, numerous specific details are set forth in order to provide a thorough understanding of the present invention. The present invention may be practiced without some or all of these specific details. In other instances, well known component or process operations have not been described in detail to not unnecessarily obscure the present invention. While the invention will be described in conjunction with the specific embodiments, it will be understood that it is not intended to limit the invention to the embodiments.

As described above, in the cloud, applications are deployed over virtual resources that are dynamically provisioned and mapped to a pool of physical servers. While this approach simplifies the server infrastructure set up, the reality of application operations is far more complex. Using this server-centric approach to cloud or distributed provisioning, enterprises that rely on the cloud or distributed computers for demanding, dynamic and mission-critical applications, expose themselves to problems including, 1) unpredictable latencies, 2) lack of visibility into resource interactions, 3) inconsistent and bad user experience, 4) disastrous effects of cascading bottlenecks and 5) wasted capacity due to over-provisioning which drives up costs.

DevOps and IT Ops teams take various approaches to resolve infrastructure problems. For example, the teams may launch multiple resources, and shut down the ones having the highest latencies or that are executing on inappropriate hardware. This approach is manual and time consuming. It leaves no opportunity for dynamic and automatic reconfiguration of the cloud networking to adapt to problems as they arise. Further, this technique involves heterogeneous management tools, many complicated scripts and manual touch points, which have errors of their own, and such errors may exacerbate rather than solve the problems.

As another approach, complicated and numerous dashboards and alarm systems can be used. These dashboards drown a user in raw data and noise and are not intuitive to use. Further, a significant portion of the raw data that is presented is not even useful to characterizing and solving the current problem of interest. Thus, sifting through these alarms and charts and identifying the true actionable information is time consuming and error prone.

In summary, monitoring and troubleshooting applications that have increasingly varying traffic loads across multiple geographies and with complex constraints, based on a "black box network" and multiple management and operations systems, is very challenging. Applications often experience periods of bad performance and downtime while DevOps teams spend their limited time and resources with hands-on operations to continuously adapt to the changing workloads, instance failures and cloud outages. Therefore, DevOps teams need more network infrastructure automation and programmability, which can be manifested as integrated tools, to overcome these challenges.

Software Defined Networking (SDN) defines a new architecture for the "network machine" and is possibly a step in trying to address these issues. SDN decouples the Network Data plane from its Control plane to enable agile virtual networks. However, as described above and in more detail below, there are a host of issues associated with optimizing application performance in the cloud that SDN does not directly address. Thus, the flexibility provided by SDN alone can't ensure predictable and high application performance cloud networking nor efficient cloud network operations.

As described herein, it is believed that tools for characterizing, abstracting and managing a tight coupling between application, cloud or distributed infrastructure and a virtual or physical network, SDN-based or not, can be used to address and fix the problems associated with optimizing application performance. This approach can be referred to as Application Defined Networking (ADN). ADN provides tools for adapting the network and working around problems automatically, thus maintaining business continuity and optimizing resource utilization. Although the following embodiments are described in the context of virtual networks and cloud environments, embodiments of the present invention may be applied to physical networks, distributed environments, and any other types of environments having an operating system (OS), such as Linux and the like.

ADN tools can characterize cloud operations, present characterization data in a manner that provides an intuitive understanding of current cloud performance issues and then generate an interface for presenting and implementing intelligent remedial actions for solving performance problems. As an example, using ADN tools, a user can discover and articulate the cloud network topology and the application topology associated with their particular applications. The tools can be configured to detect and locate the bottlenecks and provide options for working around these bottlenecks in real time. The ADN tools can be configured to enable two-way communication of performance and configuration information between applications and the networked infrastructure to allow applications to be adapted to the network and the network to be adapted to the applications in a cohesive manner.

With respect to the following figures, architecture for defining and characterizing network and infrastructure performance in an ADN environment is described. The architecture includes a number of abstractions that are presented for the purposes of illustration only and are not meant to be limiting as different abstractions can be utilized within the architecture. Although not described in detail herein, the characterization metrics derived from the characterization architecture can be presented in an interface that allows a user to manage and optimize their application performance and resource utilization in a cloud environment. In one embodiment, the characterization metrics can be derived from state variables associated with the TCP protocol.

In following sections, system architecture, flow generation, a system overview and methods that can be implemented for monitoring and managing resources are described. The system architecture section, FIGS. 1-2, describes quantities, such as paths and flows, which can be characterized by the system. More details of generating and visualizing the flow are described with respect to FIGS. 3-7 in the flow generation section. A system overview section, FIGS. 8 and 9, includes a description of example components of the system used to implement the system architecture and flow generation.

System Architecture

In the cloud, computing and communication resources are dynamically provisioned and managed to implement an application. The cloud includes software or hardware components which process, store or transport data in a cloud. There are resources which can be dynamically provisioned and managed by cloud infrastructure users and other which cannot. A resource can be a virtual machine, a virtual load balancer, a virtual router, a virtual switch or a virtual link. A manageable resource is a resource which can be reconfigured and monitored by a cloud infrastructure user. A provisionable resource is a resource which can be dynamically provisioned and allocated to a specific cloud user for a period of time.

FIG. 1 shows an abstraction of a flow path, including a source and a destination, for one embodiment. Two components of the architecture described herein are a flow and a path. A flow or path can be an abstraction of resources between a source resource and a destination resource used to carry data between two points. In one embodiment, the flow or path starts at the source's socket layer 104a and ends at the destination's socket layer 104b. The illustrated flow moves in direction 112. In a specific example, a source process 102a may initiate a flow in the source socket layer 104a, which transmits through transport layer 106a and then IP layer 108a. A destination IP layer 108b receives data from such source IP layer 108a, which is then received through destination transport layer 106b and destination socket layer 104b, and finally received by a destination process 102b.

A source or a destination of a flow or a path can be any type of logical resource. As described above, a resource is a dynamically provisioned and manageable software or hardware component which has a functional role in an application. For example, the role may be to process, store or transport data in a cloud. In one embodiment, the resource can be a logical entity. For example, it can be a virtual machine, a network service or a storage space. A resource can also be a group of similar resources. In this case, the flow between clustered resources is the aggregation of the individual flows between the clustered resources and the destination resource. This flow is also named a flow group.

The resource can be identified by its universally unique identifier (UUID). A UUID is an identifier standard used in software construction, standardized by the Open Software Foundation as part of the Distributed Computing Environment. The intent of UUIDs is to enable distributed systems to uniquely identify information without significant central coordination.

A resource can implement a transport layer, which multiplexes and demultiplexes data from different connections and communicates with the application processes via sockets. The connections are characterized by IP addresses and ports (e.g., 104a, 104b). As example, the transport layers can be UDP or TCP. In TCP/IP, every accessible server (in this case, virtual machines) has one or more IP addresses and each of those IP addresses has a large range (0-65,535) of "ports" that can be used. Connections to servers can be made based on a combination of IP address plus port. Services running on the server that accept incoming requests designate what IP/port combination they are going to listen to, and only one service can listen to any combination at one time.

A flow can represent the data exchanged between a source and a destination during a period of time. As indicated FIG. 1, a flow starts at the source transport layer 106a and ends at the destination transport layer 106b. As shown in FIG. 1, a flow is an aggregation of micro-flows (or connections). A flow can be composed by different types of microflows (or connections) 110, referred to as "elephants" (high volume, long duration) or "mice" (small volume, short duration).

As described above, to optimize the implementation of an application in the cloud, metrics that characterize the accessible underlying cloud infrastructure are useful. Metrics which characterize the activity generated by the application on this cloud infrastructure are also useful. The flow represents the activity of the application in the underlying network path. In one embodiment, a flow can be characterized at a minimum by its latency and throughput, which are both functions of time. The latency can be defined as an average time it takes for information to go from a source to a destination and back. The relevant unit of measurement is typically the millisecond. The latency metric can be applied to both flow or path objects. The throughput can be defined as a rate at which information can be reliably sent to a destination. Throughput can be expressed in terms of megabits per second (Mb/s) and it is applicable to characterizing the flow.

Other metrics can be used to characterize a flow are reliability and the number of connections. The number of connections is the number of connections composing a flow. The reliability metric can relate to packets lost and duplicated over time, a percentage of redundant information that have to been sent to recover these errors and congestion events (timeout) over time.

Figure 2:
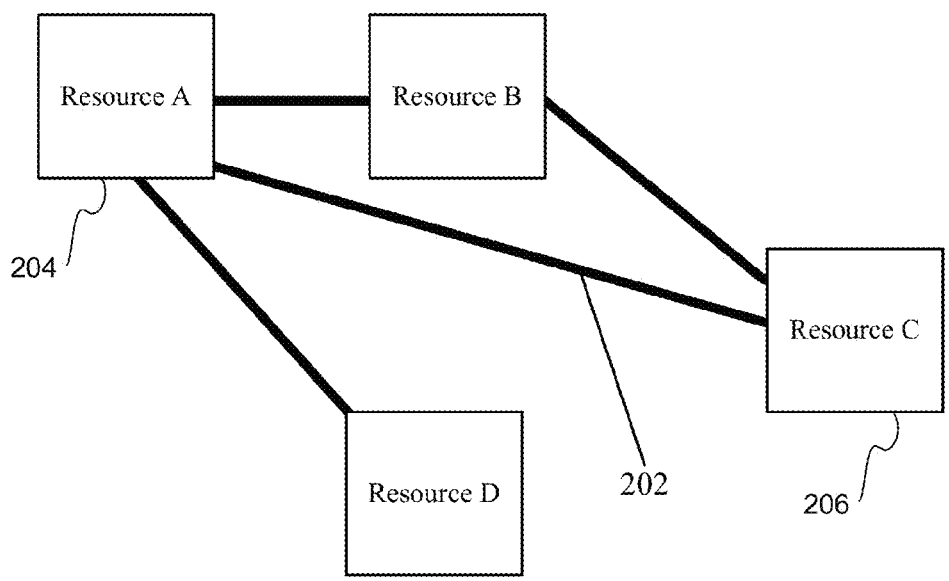
FIG. 2 shows a path connecting two resources in accordance with one embodiment.

A path is the abstraction of the sequence of network software and hardware components between a source and a destination used to carry flow data between these two points. A path starts at the transport layer of the source and ends at the transport layer of the destination. FIG. 2 shows a path 202 between two resources 204 and 206, e.g., a source and a destination.

In the embodiments described herein, it can be desirable to characterize a path. As described above, a path is defined by its source and destination. In one embodiment, the path may be characterized by its latency and capacity. The bandwidth capacity of the path is the upper bound of the rate at which information can be sent to a destination. It may happen that a flow using a path exceeds the capacity of the path. In this case there is congestion event and flow packets can be lost. The location where this congestion occurs is referred to as a bottleneck.

Another example of a metric is congestion level. This metric can be used to evaluate the severity of the congestion of a path. The congestion level can be defined on a 0 to 10 scale. Level 0 is used for a network path that is never congested (which never drops packet because of buffer overflow) while a 10 corresponds to a path blocking or dropping almost all packets for more than 1 hour. The congestion level can be defined by the number of drops and the duration of the event. Congestion can be costly. Some studies give numbers such as $42K cost for one hour of network outage. Path congestion for one hour is considered as an outage.

The path latency can be defined as the average round trip time experienced by a packet forwarded in the path. The minimum path latency is the lower bound of the path latency observed during a period of time. The latency may be expressed in milliseconds. The latency can be represented as a time function or by its statistics (min, max, mean, standard deviation, 90th percentile, 99th percentile).

The capacity can be considered as an upper bound on the amount of information that can be transmitted, stored or processed by an allocated resource. The capacity can be represented as a time function or by its statistics. For example, the path capacity is expressed in Mb/s. The path capacity is the sum of the available capacity and utilized capacity.

The latency and capacity of a path can vary over time and are not necessarily accessible directly. In particular embodiments, these characteristics can be estimated by active probing or inferred from transported data. The capacity can be represented as a time function or by its statistics.

As described above, flow or a path can start and end in the transport layer of a resource, where TCP is one example of a transport layer that can be utilized. TCP is a transport protocol which has several functions. One TCP function is to send and receive data from/to the application process. A second function is to control the congestion within the network (specifically on the network path used by the connections). In various embodiments, described herein in more detail as follows, both of the functions and variables associated with these functions (TCP variables) can be utilized. In one embodiment, TCP variables of connections between a source and a destination can be used to estimate the flow patterns as well as to detect congestions within a path.

One of the aspects of optimization and resource management may be related to identifying and responding to communication bottlenecks. A bottleneck is a spot of the infrastructure where the activity is perturbed and slowed down. A bottleneck is a problem in the cloud network that is preventing cloud resources from operating at their full capacity. For example, this could be a slow router creating network congestion or an underpowered computing resource that causes an application to slow down.

The capacity of a path is the sum of utilized capacity and available capacity. The utilized capacity is the consumed amount of information that can be transmitted by unit of time, stored or processed by a utilized allocated resource. For a path, the utilized capacity is expressed in Mb/s. The utilized capacity corresponds to the flow throughput. The available capacity is the remaining amount of information that can be transmitted by unit of time, stored or processed by a utilized allocated resource. For a path, the available capacity is expressed in Mb/s. When the available capacity approaches zero, the flow can be considered bottlenecked. When TCP is utilized, the TCP (or TCP-friendly) connections of the flow will be forced to reduce their throughput and may experience congestion events. The congestion may materialize as packet drops and a decrease of the congestion window of the connections of the source.

Flow Generation

Figure 3:
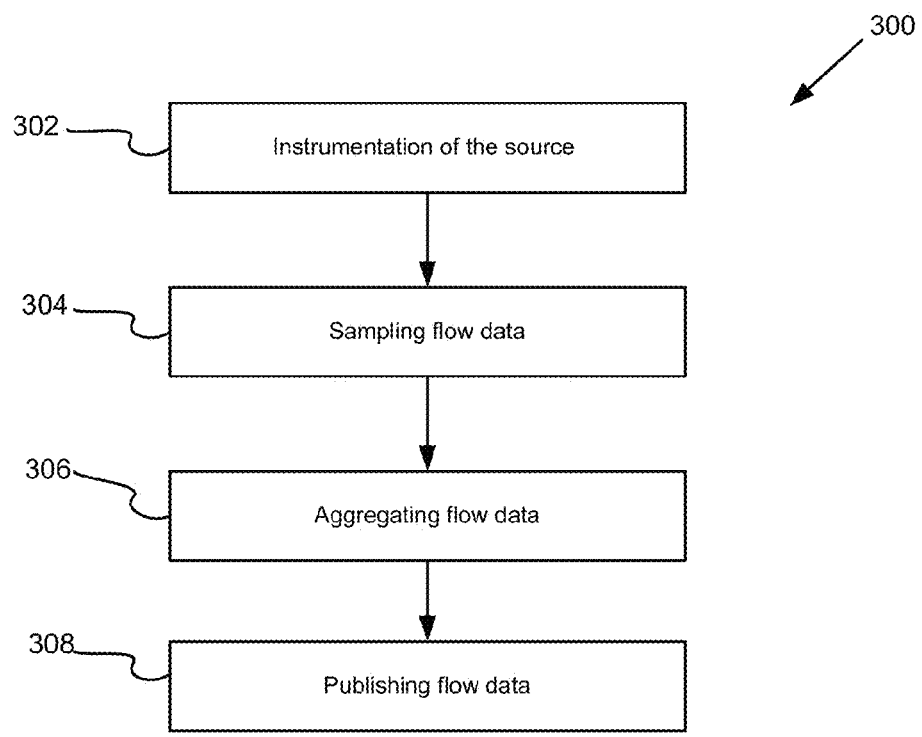
FIG. 3 is a flow chart illustrating a procedure for collecting and analyzing flow data in accordance with a specific embodiment of the present invention.

Next details of flow generation are described. FIG. 3 shows a procedure 300 for collecting and analyzing flow data. Generating a flow may require instrumentation that allows for the sampling of data. In 302, a source of flow data can be instrumented. In 304, flow data can be sampled using the instrumentation. In 306, the flow data can be aggregated to generate one or more flow and path characterization metrics. In 308, the metrics can be published.

For TCP, in 302, instrumentation can involve use of the transmission control block (TCB) in a TCP stack for each TCP connection. A simple definition of a TCP connection is a set of packets between a pair of sockets (Host IP and port pairs). Since the same pair of sockets may be used for multiple connections, the definition of a TCP connection can be more nuanced. TCP uses a special data structure called a transmission control block (TCB) to manage information about each TCP connection.

Before the process of setting up a TCP connection can begin, the devices on each end perform some "prep work". One of the tasks required to prepare for the connection is to set up the TCB that will be used to hold information about such connection. This set up task can be done right at the very start of the connection establishment process, when each device just transitions out of the CLOSED state.

The TCB contains all the important information about the connection, such as the two socket numbers that identify it and pointers to buffers where incoming and outgoing data are held. The TCB is also used to implement the sliding window mechanism. It holds variables that keep track of the number of bytes received and acknowledged, bytes received and not yet acknowledged, current window size and so forth. Of course, each device maintains its own TCB for the connection.

Figure 4:
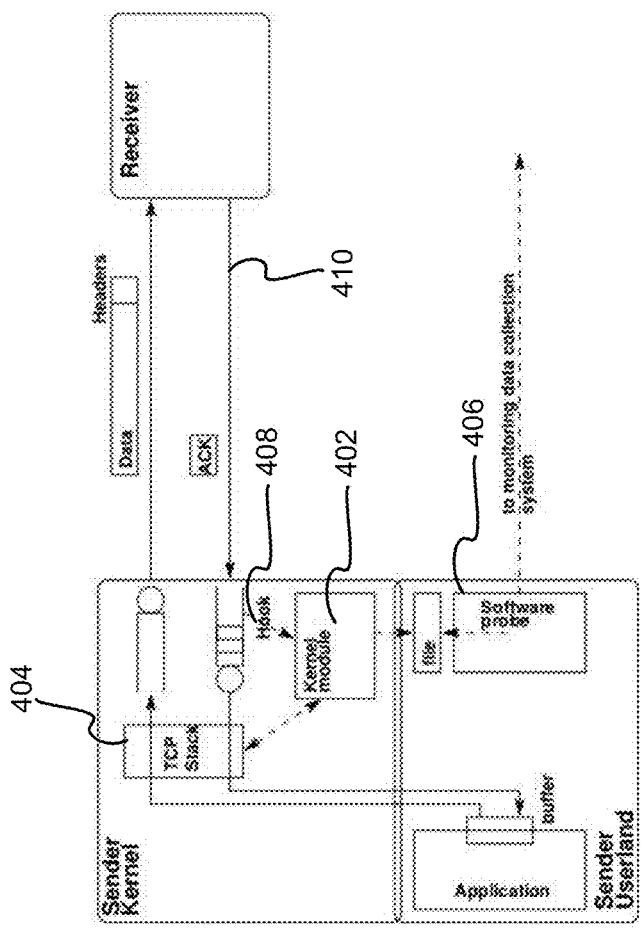
FIG. 4 is a block diagram of instrumentation for flow data collection in accordance with one example implementation of the present invention.

FIG. 4 illustrate the principle of the instrumentation of the TCP stack and the flow data collection for one embodiment. In one embodiment, instrumentation 302 can involve using a modified version of the TCP-probe kernel module (402), which enables access to the TCB of a TCP stack (404). This modification can be used to expose more variables and particularly the variables needed to measure latency, throughput and congestion. In Linux, a TCP probe may be a software module 406 that records the state of a TCP connection in response to incoming packets. It works by inserting a hook (408) into the tcp_recv processing path (410) using kprobe so that the congestion window and sequence number can be captured. For instance, an association between the IP's of the endpoints and the flow's QUID may be maintained since the resource's IP can change, for example, when stopped and started.

In an alternative embodiment, instrumentation of the TCP stack (e.g. Web100, Web10G) may require adding counters throughout the network code of the kernel, which makes it mandatory to have a specific kernel (whole, not just a kernel module) compiled. In yet another embodiment, instrumentation 302 may involve capturing all the packets (e.g. tcpdump, libpcap, specific capturing device) and reconstructing the connections information. In this approach, space, compute time and assumptions on the behavior of the TCP stack in the targeted systems (specific case for the twenty or so configuration parameters of the TCP stack) may be used.

In 304, sampling may involve sampling TCP variables that are maintained by TCP. The TCP stack updates the TCP variables when a packet is sent and an acknowledgement is received. The sampling processes can be parameterized. For example, a user may be able to specify a frequency of the sampling and what TCP variables to sample. Further, the user may be able to select a number of samples or a time period used to determine an average quantity based on the sampling. In one embodiment, the sampling can be triggered in response to a reception of an acknowledgement or a modification of a specific TCP variable.

In 306, the collected data can be aggregated to generate one or more flow metrics. Examples of collected data can include but are not limited to 1) CumulSent: last snd_nxt seen over the period, 2) CumulAcked: last snd_una seen over the period, 3) NbAck: the total number of ACKs seen for this connection, 4) NbPackets: the total number of times we have seen the snd_nxt change between two successive ACKs, 5) SRTT: the mean value of the srtt over the period. 6) RTTVAR: the mean value of the rttvar over the period, 7) RTO: the mean value of the rto over the period, 8) LostOut: the max value of lost we have seen over the period, 9) Retrans: last retrans seen over the period, 10) MinInflight: minimum of inflight segments seen over the period, 11) MaxInflight: maximum of inflight segments seen over the period, 12) MinCWND: minimum value of the cwnd seen over the period, 13) MaxCWND: maximum value of the cwnd seen over the period, 14) MinSSTRESH: minimum value of the sstresh seen over the period, 15) MaxSSTRESH: maximum value of the sstresh seen over the period, 16) MinWND: minimum value of the receive window over the period, 17) MaxLength: maximum packet length seen over the period and 18) NbRTO: estimation of the number of RTO events, based on the number of times the frto_counter moved.

In 308, flow data publishing can involve generating reports for each resource. The reports can include time varying data for each of the flow metrics determined in 306. The time varying data can be output in various formats to the users to allow the user to grasp a performance of their application in the cloud.

Figure 5:
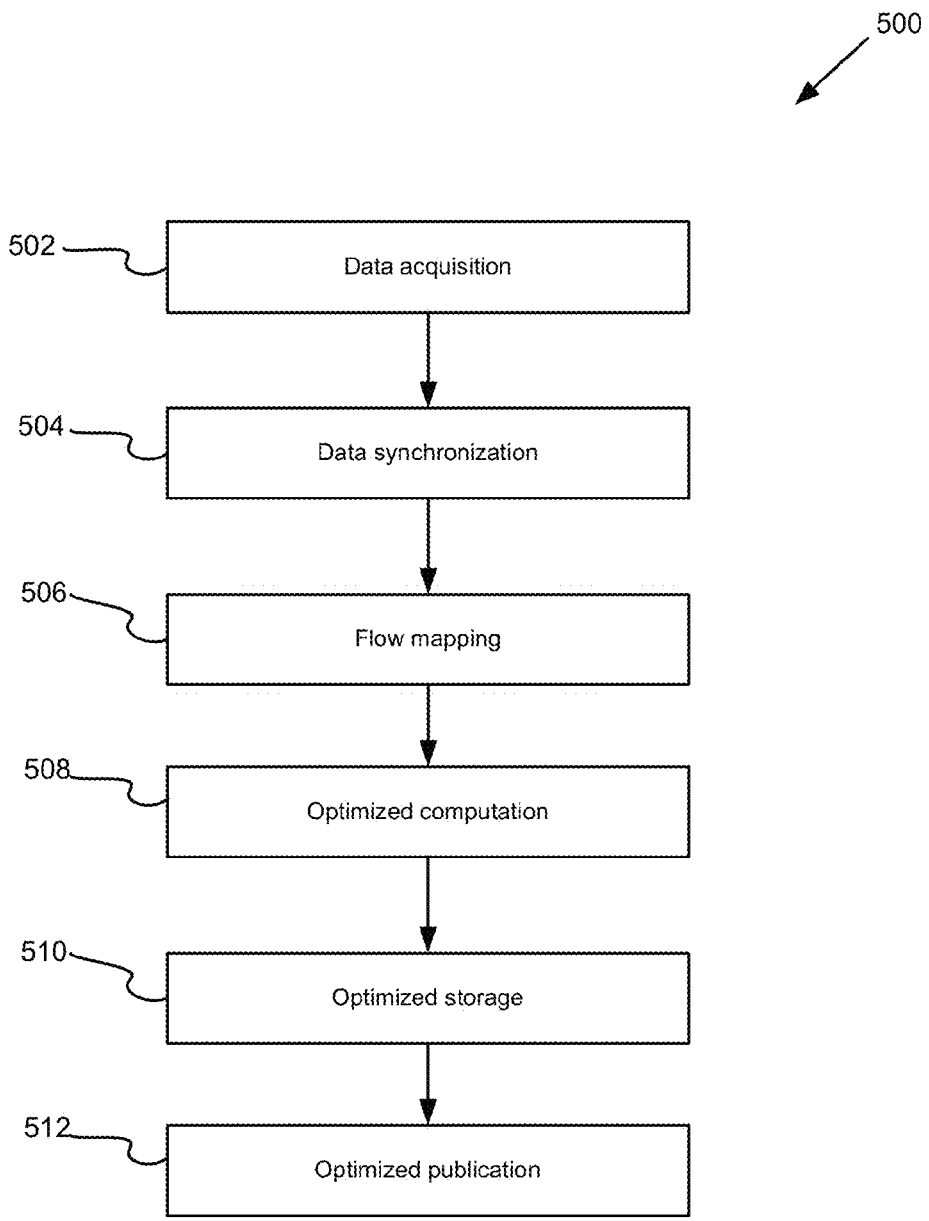
FIG. 5 is a flow chart illustrating details of multiple flow data processing in accordance with a specific implementation of the present invention.
Figure 6:
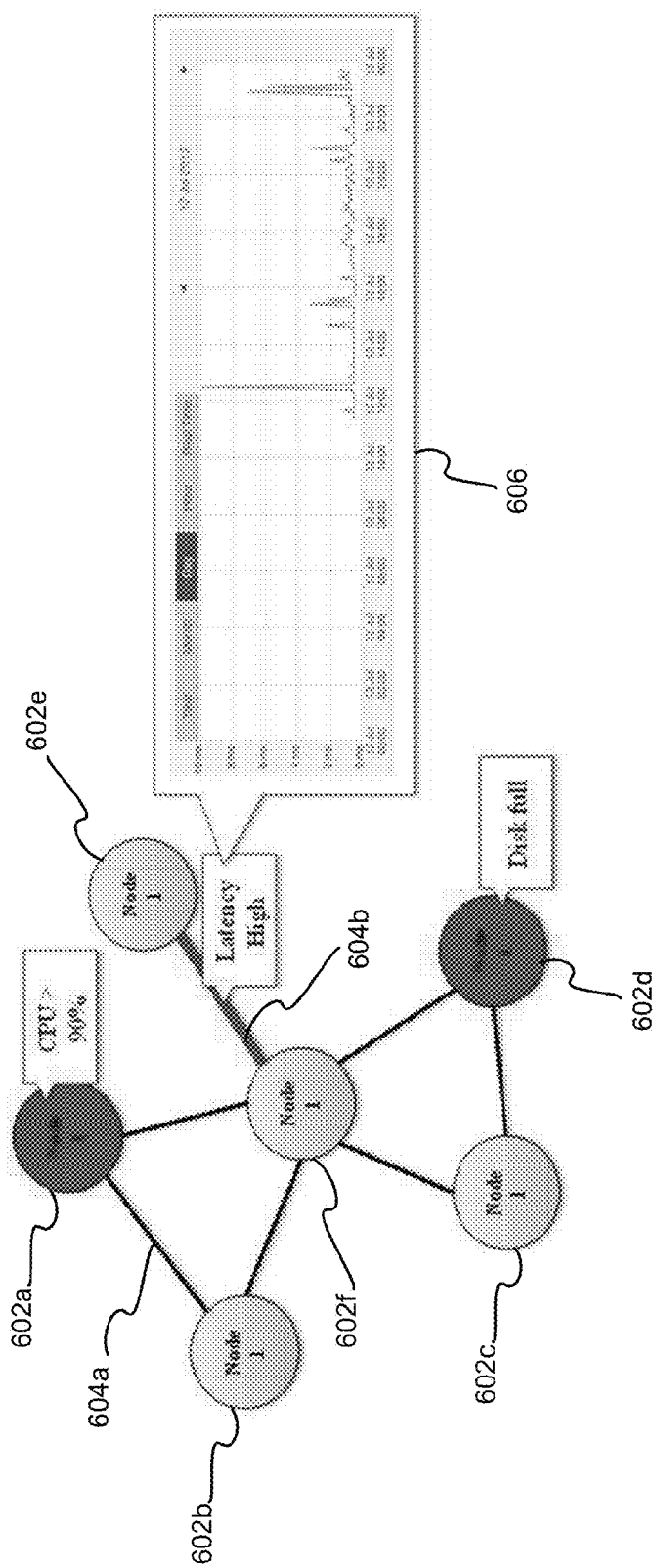
FIG. 6 is a diagrammatic representation of an example flow map in accordance with one embodiment of the present invention.

Next, details of multiple flow data processing are described with respect to FIG. 5. In operation 502, data acquisition can include collecting in real-time data from multiple resources. These data include flow data as well as virtual resource data. The data may be received asynchronously on a communication bus. Several samples may belong to the same flows and may be grouped by time periods. As described above, the time periods may be a selectable parameter. In operation 504, the acquired data can be resynchronized in a consistent time series. In operation 506, flow mapping can include extracting the IP addresses from the samples, determining the associated virtual machines and updating the flow information based upon the received samples. In operations 508, 510, and 512, time series representing metrics of a given flow can be processed for real-time analysis, statistics computations, compressed storage and real-time publication.

Once the flows are characterized, a flow map can be generated to visually represent properties of the flow. The visual representation can be geared toward providing information that aids in managing the cloud resources. In one embodiment as shown below in FIG. 6, a flow map can be generated to display congestion or bottleneck events. The flow map includes 6 nodes (e.g., 602a-602f) and 7 flows (e.g., 604a and 604b). Two nodes (602a and 602d) and one flow (604b) are high-lighted because of resource issues. Node 602a has a CPU usage greater than 90%. A second node 602d has a disk near capacity. The flow 604b is identified as having a high latency. A resource graph 606 associated with the latency may be displayed to provide additional insight into the latency issue.

In general, the flow map can be configured to display the application graph with flows between nodes. The flows can represent the usage of the network from one virtual resource to another. A flow list generated by a system component, such as the UI (see FIG. 9, UI generator 36) can display the activity and corresponding health (time-series (charts) and statistics with user-defined alert thresholds) of each flow. A node list generated by the system can display activity and corresponding health (time-series (charts) and statistics with user-defined alert thresholds) of each node.

A flow map represents a particular grouping of resources and the connections between the resources. In particular embodiments, the connections can be associated to exactly one flow to make sure there is no double-counting. The rules to create flows can be defined using any characteristics associated to connections. The default partitioning may be done using the source and destination IPs of the connections. If connections are not covered by any flows, a warning can be issued to make the user reconsider its partition scheme.

In other embodiments, along with the flow map, the system can generate snap shots and heat maps. A snap shot can display quantities, such as top utilized resources (hotspots & potential bottlenecks), top flows (max throughput, max activity) and top flow latency (highest latency). The flows can be sorted according to these different parameters. A heat map can prove a representation of network performance where the individual values (latency & available capacity) of the network path matrix are represented by gradual colors. In this matrix, the row and lines corresponding to path with activity, the flow statistics are represented.

Figure 7:
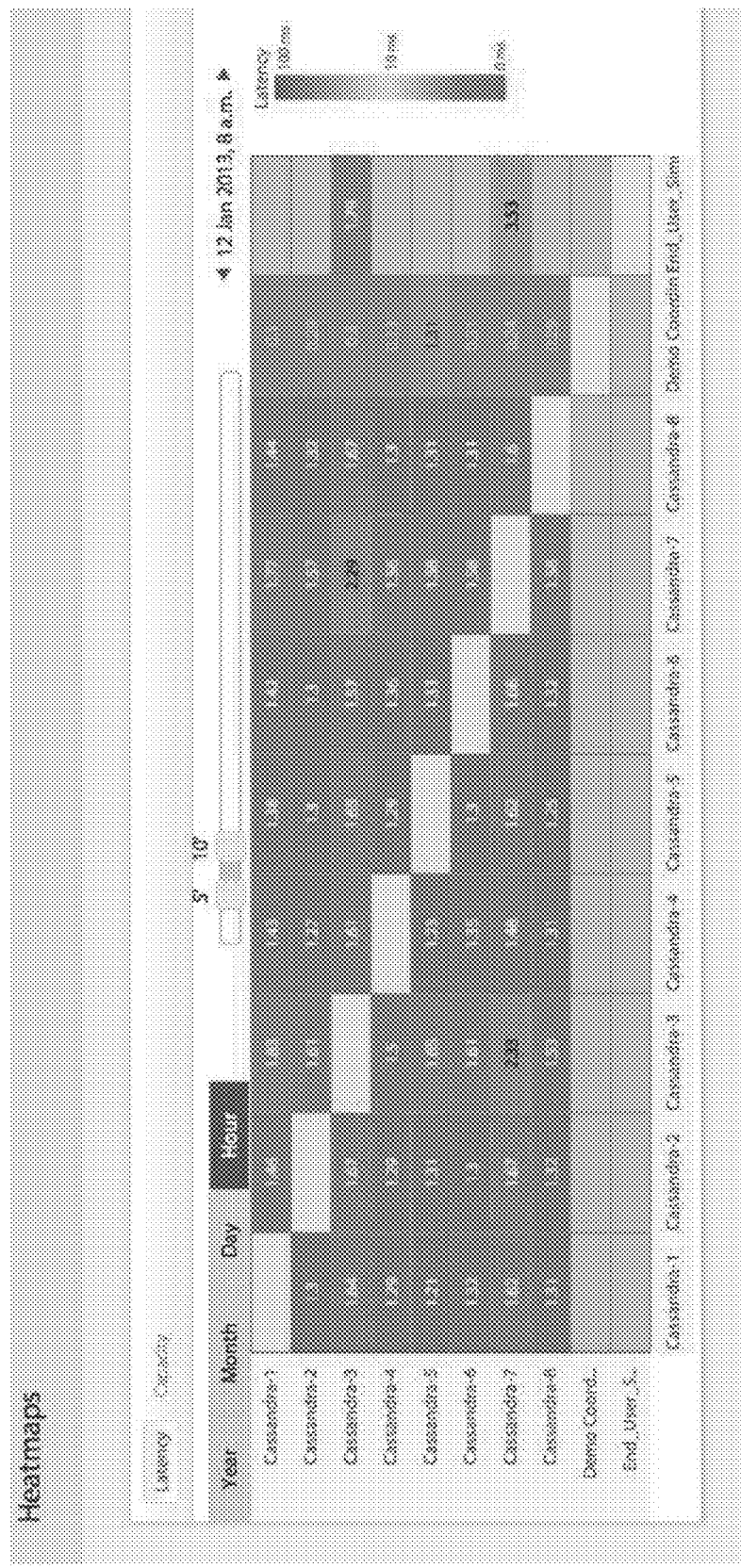
FIG. 7 a is a screen shot from a user interface (UI) including a heat map in accordance with a specific embodiment.

In the example of FIG. 7, each cell is active, such that a selection of the cell redirects the user to detailed performance information. After selection, the detailed information can be displayed in a pop up window or the system can generate another page that displays the information.

System Overview

In this section, an overview of a system providing tools that allow a user to manage their cloud resource is described. For illustrative purposes, an example topology of customer's resources in the cloud and management of these cloud resources is first described with respect to FIG. 8. Then, a system for implementing the resource management strategy described in FIG. 8 is discussed with respect to FIG. 9.

Referring back to the example of FIG. 2, four resources A~D associated with a user's applications executing in the cloud are shown. In FIG. 8, four flows (Flows 1 and 2 of 806*a*, Flow3 of 806*c*, and Flow 4 of 806*d*)) have been mapped to the resources in FIG. 2. The resources and the associated flows may have been automatically discovered by the system. For instance, a user may have provided access credentials to the system that enable the system to discover the user's current usage of cloud resources. UI flows, as in the flow map, can be made of potentially two flows at the monitoring layer, one for each direction. FIG. 7 shows the metrics of the flow for each direction.

Figure 8:
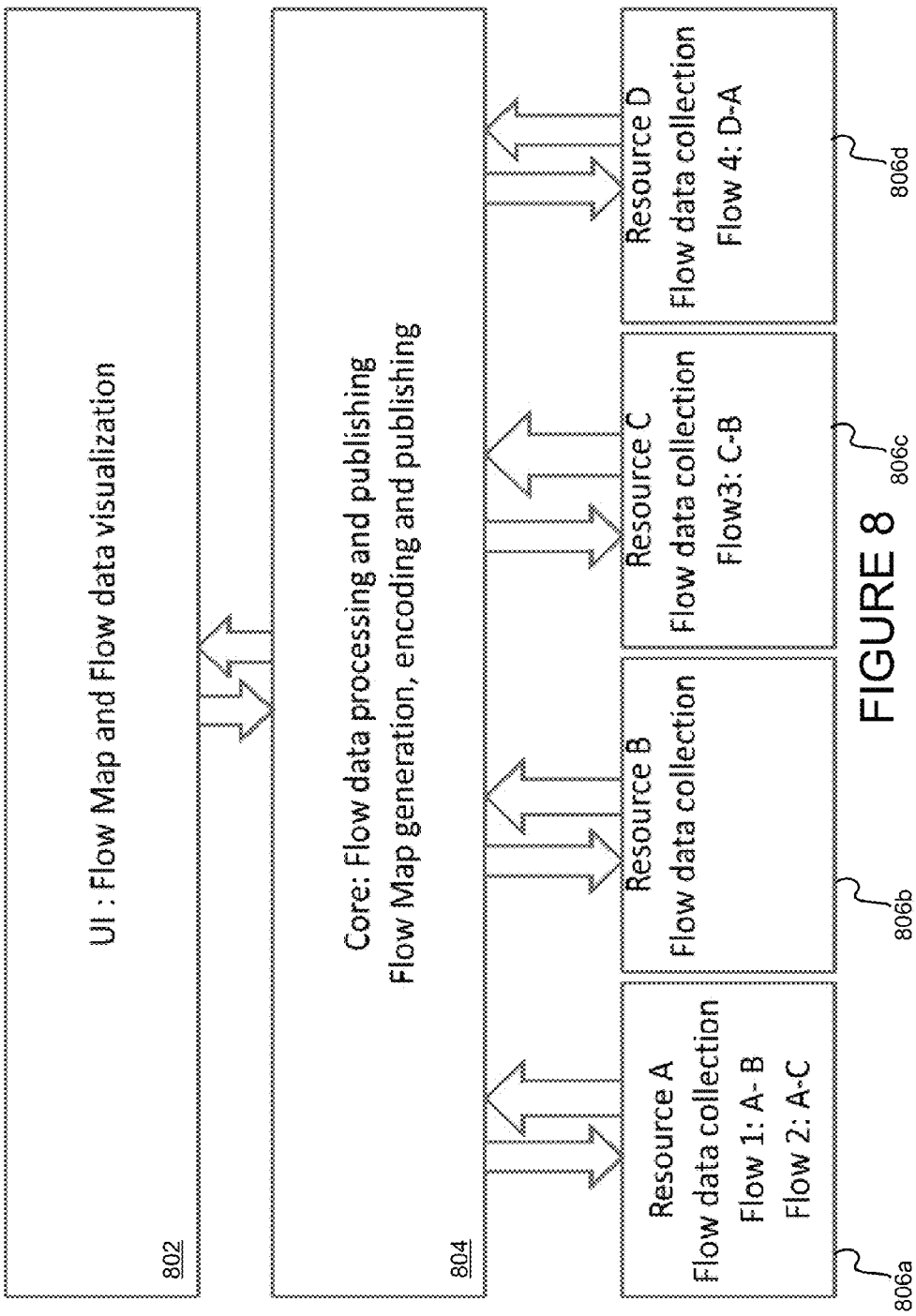
FIG. 8 is diagrammatic representation of an example system that can provide flow characterization and resource management for customer cloud resources in accordance with one embodiment.

With respect to FIG. 8, resource topologies with more or less flows and more or less resources are possible. Further, different flow mappings between resources A, B, C and D including more or less flows is possible. In addition, the number of flows and the number of resources for a particular user can change over time. For example, at a first time the user may utilize four resources, at a second time a user may utilize three resources and at a third time a user may use six resources. From time to time, some of the flows may remain constant, new flows may be added or existing flows and/or resources may be terminated. Thus, the number of flows and their associated sources and destinations is provided for the purposes of illustration only and is not meant to be limiting.

Returning to the example in FIG. 8, resource A can collect flow data for a first flow between resource A and B and a second flow between A and C as shown by 806*a*. Resource C can collect flow data for a third flow between C and B as shown in 806*c*. Resource D can collect flow data for a fourth flow between D and A as shown in 806*d*. Resource B may have the ability to collect flow data but, in this example, the collected data is not associated with any flows (806*b*). To enable the data collection measurement software may have been previously download to the resources.

The measurement software on each of the resources can acquire data and send the acquired data to a core 804 for processing. The data acquisition can be an ongoing process where the measurement software is acquiring at different times. The data acquired over time can be used to characterize resource performance over time. In one embodiment, the measurement software on each resource may acquire data in an asynchronous manner from one another. Thus, the core can be configured to perform operations that involve synchronizing the data received from each of the resources such that it can be output in a time consistent manner.

Besides processing the data acquired from the resources, the core can be configured to automatically discover the resources for a user, such as resources A, B, C and D, generate a topology of the resources, deploy instrumentation to collect flow data, determine the flows between the resources, process the acquired data to generate path and flow characterization metrics publish results and process the flows to generate a network graph of flows. In one embodiment, the results can be published via a UI 802 that provides flow maps and flow data visualization for the various discovered resources. Further, the UI can be used to perform actions which affect the resources.

Figure 9:
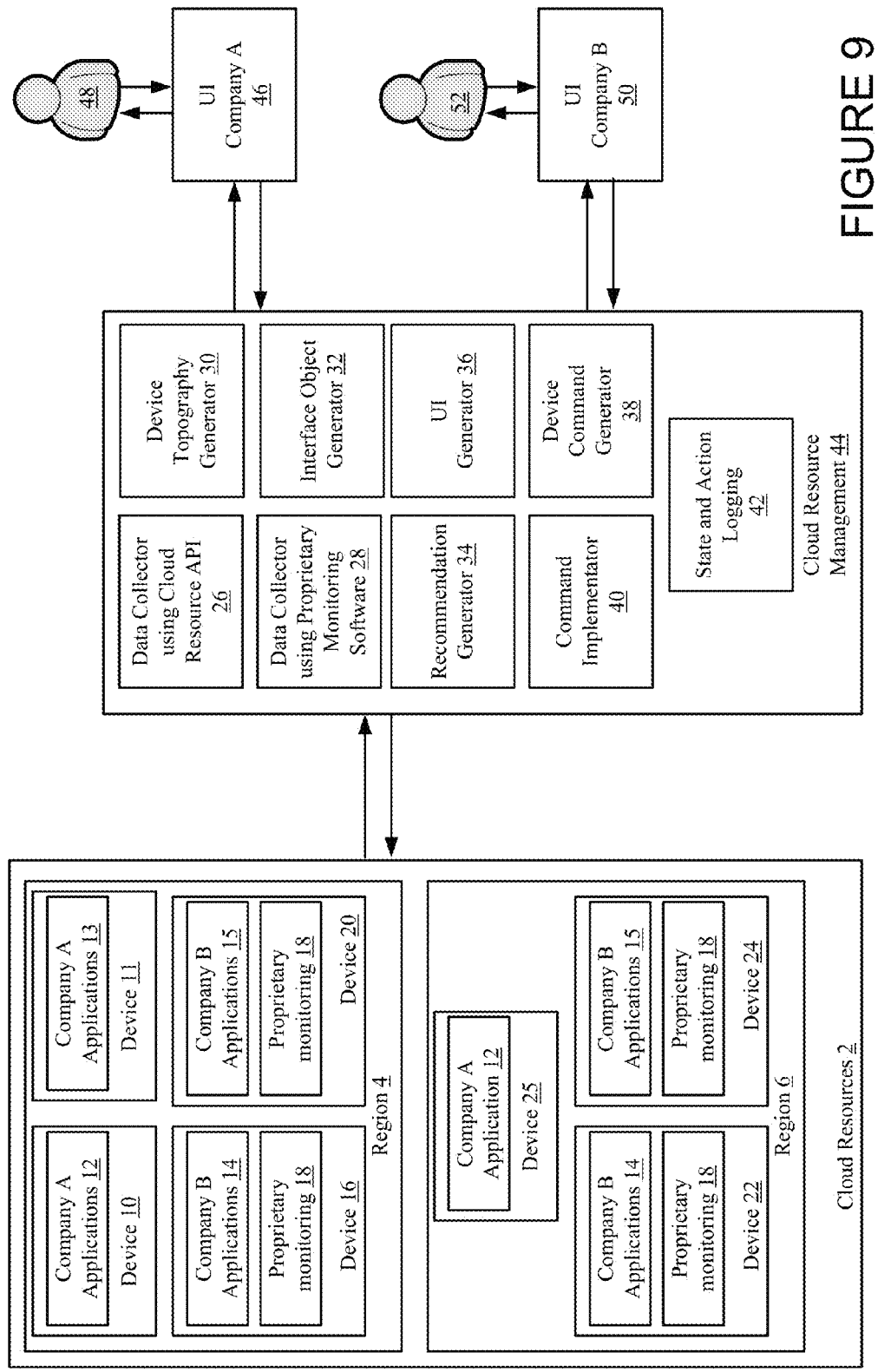
FIG. 9 is a diagrammatic representation of a system providing cloud resource management in accordance with one embodiment.

With respect to FIG. 8, a system configured to perform some of the core and UI functions is described. In FIG. 9, for the purposes of illustration, an example configuration involving resource performance visualization and management for two different companies, company A and company B is discussed. Company A and company B utilize cloud resources 2. Company A and company B may each have a distinct set of customers that utilize the applications provided by each company. Company A and company B are typically unaware of each other's resource utilization in the cloud.

The cloud resources 2 are distributed in two different regions, region 4 and region 6. Typically, regions refer to separate geographic locations, such as resources located in the eastern United States and the western United States or resources located in United States and Europe. The resources are distributed to serve users of the applications in a particular geographic area. The allocation of resources in relation to demand in a particular area affects application performance. Thus, the assessment and visualization of the performance of cloud resources according to region can be important.

In the example of FIG. 9, a first set of applications 12 associated with company A are executing on device 10 in region 4, a second set of applications 13 associated with company A are executing on device 12 in region 4 and a second instantiation of the first set of applications 12 associated with company A are executing on device 25 in region 6. Further, a first set of applications 14 associated with company B are executing on device 16 in region 4, a second set of applications 15 associated with company B are executing on device 20 in region 4, a second instantiation of the first set of applications 14 associated with company B are executing on device 22 in region 6 and a second instantiation of the second set of applications 15 associated with company B are executing on device 24 in region 6. As described above, the devices can refer to logical entities. For example, device 10 can be a single virtual machine or a cluster of virtual machines. In addition, a set of applications executing on a device can include multiple instantiations of one or more applications within the set where the number of instantiations within the set can change over time.

The different sets of applications can communicate with one another to complete a task. For example, the first set of applications 12 for company A on devices 10 and 25 may each communicate with the second set of applications 13 on device 11. As another example, the first instantiation of the first set of applications 14 associated with company B on device 16 can communicate with the first instantiation of the second set of applications 15 associated with company B on device 20 to complete a task. In addition, the second instantiation of the first set of applications 14 associated with company B on device 22 in region 6 can communicate with one or both of the first instantiation of the second set of applications 15 on device 20 in region 4 or the second instantiation of the second set of applications 15 on device 24 in region 6 to complete a task.

In one embodiment, proprietary monitoring software can be deployed. However, its deployment is optional. The proprietary monitoring software can be executed in conjunction with the applications to provide additional measurements that can be used to characterize application performance in the cloud. However, even without the deployment of the software, some useful performance measurements may be obtained using functions that are native to the cloud resource, such as functions available via a cloud resource API (Application Program Interface) or a Network monitoring API. Thus, embodiments with and without the proprietary monitoring software are possible. In the example of FIG. 9, additional monitoring software 18 has been deployed for the applications executed by company B but not for the applications executed by company A.

The applications, the devices on which they execute and the communication patterns form a topology in cloud. The topology may involve two layers of abstraction. At a higher level, the network topology can be presented as virtual devices and virtual communication paths. At a lower level, the virtual devices and virtual communication paths can be mapped to actual physical devices and physical communication paths. Thus, a mapping exists which translates the virtual representation of the devices and paths at the higher level to the lower level including physical devices and paths.

In a cloud environment to allow for the most efficient use of resources, cloud resource providers don't provide users with a fixed set of physical resources. Instead, the users are provided with access to some amount of physical resources. However, the physical resources that are provided to each user at a particular time can vary. The abstraction from higher level virtual entities to lower level physical entities helps to enable providing cloud resources as part of a "fee for service" model because it allows some of the physical aspects associated with providing the resources to be hidden from the user.

A very simple analogy is purchasing power. Users of a power grid can agree to purchase a certain amount power and are provided access to the power. The power can be generated by different power plants at different times and the user has no control from which power plants they receive power. In addition, the power can be routed by different paths to the user over the electricity grid. Again, the user has no control over how power is routed on the grid. Generally, as long as the user of the power receives reliable power, the user doesn't care where or how the power is delivered to them.

In traditional networking, to use the analogy above, users often had control of and were responsible for upkeep of the power plants (e.g., servers) and a portion of the electricity grid (e.g., local communications within or between servers). In a cloud environment, this paradigm has changed which provides some advantages but also introduces some new complexities. One such complexity is that unlike power consumption, cloud resource providers have not reached the point where they can reliably provide a guaranteed level of performance under varying demand levels to all of their customers.

If there was sufficient excess computational, memory and network capacity in the cloud and the cost was low, then cloud resource management would not be such an issue. However, currently, this is not the case in the cloud environment. Thus, tools are needed that help users manage their resource consumption and utilization to respond to changes in the cloud environment that affect the performance of the user's application. If power delivery were less reliable, then one would expect to tools in the power industry to help users manage their power consumption in a similar manner.

As described in more detail as follows, the system can be configured to discover different sets of applications executing in the cloud including patterns of inter-device communication that the applications utilize, generate metrics as a function of time that characterize that resource performance including inter-device communication and abstract a topology. The performance information can be mapped to the abstracted topology. The topology and its associated information can be presented in a user interface (UI). Besides the topology, the UI can provide a number of different services for managing the discovered cloud resources in real-time. The topology is abstracted and visually formatted in the UI to present information in a manner that makes managing the cloud resources simple and intuitive. The topology is also encoded in an XML format so that the user can access in an online or offline manner. VXDL is for example a virtual network description language which can be expressed in XML.

In FIG. 9, the cloud resource management 44 is configured to provide the functions described in the previous paragraph. Cloud resource management 44 communicates with the cloud resources 2 and generates user interfaces for managing the cloud resources. In this example, the cloud resource management 44 is shown generating two UI's simultaneously, a first one 46 for company A and a second one 50 for company B. The UI's can receive inputs that trigger actions by the cloud resource management 44, such as inputs from user 48 and user 52. The UI's can be presented remotely on company controlled devices.

The cloud resource management 44 can be implemented on one or more electronic devices including processors, memory and network interfaces. Some examples of the functions that can be provided by the cloud resource management 44 are as described as follows. Data collector 26 uses native cloud functions, such as a cloud resource API, to collects data for a resource topography map that can be output in a UI. It can automatically discover a company's resources in the cloud. This function doesn't require proprietary software deployed to and running on cloud devices. However, if the proprietary software is deployed, data acquired from 26 and the proprietary software can be combined in some manner and then output to a UI.

Data collector 28 receives data from proprietary monitoring software executing in the cloud. In one embodiment, the received data can be used to generate paths and flows that are output to the UI or to an API. Device topography generator 30 generates a device topography map with or without flows depending on the data collected. Different topography abstractions are possible. Thus, the device topography generator 30 can be configured to generate one or more different topography maps depending on the abstraction that is utilized. In one embodiment, the UI may allow a user to select from among group of different topography abstractions one or more maps to be presented in the UI.

The interface object generator 32 generates and formats data for presentation to user in UI. For example, in one embodiment, the interface object generator 32 may generate flow and path objects that are used in a device topology map or an abstract flow map. The recommendation generator 34 can be configured to analyze data acquired from the cloud resource and determine actions that may improve the performance of the applications executing in the cloud. The actions can be presented as recommendations in the UIs, such as 46 and 50, where the UI provides mechanisms for allowing a user, such as 48 or 52, to indicate they wish to implement the recommendation. The UI Generator 36 generates and controls a UI that can include recommendations, topography map and interface objects for each user (e.g., company A and company B). The execution of the recommended workflow of actions can also be automated after some machine learning mechanism has captured the optimal remediation and typical choice of a user in a given scenario.

The device command generator 38 can be configured to generate commands for actions triggered via the UI. Actions in the UI can be presented in a high-level format. For example, a user may indicate they wish to move an execution of an application from a first virtual machine to a second virtual machine by dragging a symbol associated with the application from the first virtual machine and placing it in the second virtual machine using a cursor or some other control mechanism. In response to this action, the device command generator 38 can generate a sequence of low-level commands to implement the action on the two devices. For instance, commands can be generated by the UI that cause the first virtual machine to shut down a resource running application and cause a new instantiation of the resource with the application running to be generated on the second virtual machine. The action can also involve moving the entire virtual machine from one network to one another with less congestion.

The command implementator 40 communicates with specific devices to implement commands determined from the device command generator 38. The command implementator 40 can be configured to communicate with the affected resources and keep track of whether the action has been successfully completed or not. The state and action logging 42 can be configured to log actions that are implemented, such as actions triggered from inputs received via the UI. Further, the state and action logging 42 can be configured to saves snap shots of a topology maps showing a state of user resources at various times. For example, the snap shots can be taken before and after a user implements one or more actions via the UI. Then, the snap shots can be shown side by side in the interface to allow the user to visually assess whether the actions had their intended effect. The evolution of the infrastructure state associated to the sequence of actions that are selected to improve the performance can be captured and encoded to reinforce the machine learning system. A model based on a dynamic graph can be used. The main attributes of this graph can be encoded in a computing language so an application can program its adaptation to the infrastructure in advance and the actions be executed automatically when conditions appear.

The various aspects, embodiments, implementations or features of the described embodiments can be used separately or in any combination. Various aspects of the described embodiments can be implemented by software, hardware or a combination of hardware and software. The computer readable medium is any data storage device that can store data which can thereafter be read by a computer system. Examples of the computer readable medium include read-only memory, random-access memory, CD-ROMs, DVDs, flash memory, memory sticks, magnetic tape, and optical data storage devices. The computer readable medium can also be distributed over network-coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. A method for analyzing network flow activity implemented by a network traffic management system comprising one or more network traffic management apparatuses, client devices or server devices, the method comprising:
    identifying one or more virtual resources associated with one or more servers;
    acquiring flow data associated with one or more paths for one or more packets communicating between the one or more virtual resources in a first time period;
    determining any recommended network flow actions by:
        generating one or more flow mappings by extracting IP addresses from the flow data associated with the one or more paths in the first time period;
        analyzing the acquired flow data associated with the one or more paths in the first time period using the generated flow mappings; and
    automatically executing any recommended network flow action on one or more flows.

2. The method of claim 1, wherein the flow data comprises TCP (Transport Control Protocol) variables, or UDP (User Datagram Protocol) variables.

3. The method of claim 1, wherein the generating one or more flow mappings includes a network threshold event to manage the one or more virtual resources, wherein the network threshold event comprise CPU usage associated with a node, a disk capacity associated with a node, a latency associated with one of the one or more flows, displaying the flow activity and corresponding health associated with each flow, or displaying the flow activity and corresponding health associated with each node.

4. The method of claim 1, wherein the one or more virtual resources further comprise a virtual load balancer, a virtual router, a virtual switch, or a virtual link.

5. A network traffic management apparatus, comprising a memory with programmed instructions stored thereon and one or more processors configured to be capable of executing the stored programmed instructions to:
    identify one or more virtual resources associated with one or more servers;
    acquire flow data associated with one or more paths for one or more packets communicating between the one or more virtual resources in a first time period;
    determine any recommended network flow actions by:
        generating one or more flow mappings by extracting IP addresses from the flow data associated with the one or more paths in the first time period; and
        analyzing the acquired flow data associated with the one or more paths in the first time period using the generated flow mappings; and
    automatically execute any recommended network flow action on one or more flows.

6. The apparatus of claim 5, wherein the flow data comprises TCP (Transport Control Protocol) variables, or UDP (User Datagram Protocol) variables.

7. A non-transitory computer readable medium having stored thereon instructions for analyzing network flow activity, comprising executable code which when executed by one or more processors, causes the one or more processors to:
    identify one or more virtual resources associated with one or more servers;
    acquire flow data associated with one or more paths for one or more packets communicating between the one or more virtual resources in a first time period;

determine any recommended network flow actions by:
  generating one or more flow mappings by extracting IP addresses from the flow data associated with the one or more paths in the first time period,
  analyzing the acquired flow data associated with the one or more paths in the first time period using the generated flow mappings; and
automatically execute any recommended network flow action on one or more flows.

8. The medium of claim 7, wherein the flow data comprises TCP (Transport Control Protocol) variables, or UDP (User Datagram Protocol) variables.

9. The medium of claim 7, wherein to generate one or more flow mappings includes a network threshold event to manage the one or more virtual resources, wherein the network threshold event comprise CPU usage associated with a node, a disk capacity associated with a node, a latency associated with one of the one or more flows, displaying the flow activity and corresponding health associated with each flow, or displaying the flow activity and corresponding health associated with each node.

10. The medium of claim 7, wherein the one or more virtual resources further comprise a virtual load balancer, a virtual router, a virtual switch, or a virtual link.

11. The medium of claim 7, wherein the executable code when executed by the one or more processors further causes the one or more processors to:
  determine a bandwidth capacity metric or a latency metric for the one or more paths;
  compare the bandwidth capacity metric to a bandwidth threshold or the latency metric to a latency threshold; and
  provide an indication when the bandwidth capacity metric exceeds the bandwidth threshold or the latency metric exceeds the latency threshold.

12. The method of claim 1, further comprising:
  determining a bandwidth capacity metric or a latency metric for the one or more paths;
  comparing the bandwidth capacity metric to a bandwidth threshold or the latency metric to a latency threshold; and
  providing an indication when the bandwidth capacity metric exceeds the bandwidth threshold or the latency metric exceeds the latency threshold.

13. The apparatus of claim 5, wherein to generate one or more flow mappings includes a network threshold event to manage the one or more virtual resources, wherein the network threshold event CPU usage associated with a node, a disk capacity associated with a node, a latency associated with one of the one or more flows, displaying the flow activity and corresponding health associated with each flow, or displaying the flow activity and corresponding health associated with each node.

14. The apparatus of claim 5, wherein the one or more virtual resources further comprise a virtual load balancer, a virtual router, a virtual switch, or a virtual link.

15. The apparatus of claim 13, wherein the one or more processors are further configured to be capable of executing the stored programmed instructions to:
  determine a bandwidth capacity metric or a latency metric for the one or more paths;
  compare the bandwidth capacity metric to a bandwidth threshold or the latency metric to a latency threshold; and
  provide an indication when the bandwidth capacity metric exceeds the bandwidth threshold or the latency metric exceeds the latency threshold.

16. The method of claim 1, wherein the one or more virtual resources comprise a plurality of virtual machines and providing the one or more flow mappings for display by a graphical user interface of a client.

17. The apparatus of claim 5, wherein the one or more virtual resources comprise a plurality of virtual machines and providing the one or more flow mappings for display by a graphical user interface of a client.

18. The medium of claim 7, wherein the one or more virtual resources comprise a plurality of virtual machines and providing the one or more flow mappings for display by a graphical user interface of a client.

19. A network traffic management system, comprising one or more traffic management apparatuses, client devices, or server devices, the network traffic management system comprising memory comprising programmed instructions stored thereon and one or more processors configured to be capable of executing the stored programmed instructions to:
  identify one or more virtual resources associated with one or more servers;
  acquire flow data associated with one or more paths for one or more packets communicating between the one or more virtual resources in a first time period;
  determine any recommended network flow actions by:
    generating one or more flow mappings by extracting IP addresses from the flow data associated with the one or more paths in the first time period;
    analyzing the flow data associated with the one or more paths in the first time period using the generated flow mappings; and
  automatically execute any recommended network flow action on one or more flows.

20. A network traffic management system of claim 19, wherein the flow data comprises TCP (Transport Control Protocol) variables, or UDP (User Datagram Protocol) variables.

21. A network traffic management system of claim 19, wherein the generating one or more flow mappings includes a network threshold event to manage the one or more virtual resources, wherein the network threshold event comprise CPU usage associated with a node, a disk capacity associated with a node, a latency associated with one of the one or more flows, displaying the flow activity and corresponding health associated with each flow, or displaying the flow activity and corresponding health associated with each node.

22. A network traffic management system of claim 19, wherein the one or more virtual resources further comprise a virtual load balancer, a virtual router, a virtual switch, or a virtual link.

23. A network traffic management system of claim 19, wherein the one or more processors are further configured to be capable of executing the stored programmed instructions to:
  determine a bandwidth capacity metric or a latency metric for the one or more paths;
  compare the bandwidth capacity metric to a bandwidth threshold or the latency metric to a latency threshold; and
  provide an indication when the bandwidth capacity metric exceeds the bandwidth threshold or the latency metric exceeds the latency threshold.

24. A network traffic management system of claim 19, wherein the one or more virtual resources comprise a plurality of virtual machines and providing the one or more flow mappings for display by a graphical user interface of a client.

* * * * *